(12) United States Patent
Brouwer

(10) Patent No.: US 11,757,275 B1
(45) Date of Patent: Sep. 12, 2023

(54) DETACHABLE SNAP-IN FITTING

(71) Applicant: ALLIED TUBE & CONDUIT CORPORATION, Harvey, IL (US)

(72) Inventor: Shaun Brouwer, Saint John, IN (US)

(73) Assignee: ALLIED TUBE & CONDUIT CORPORATION

( * ) Notice: Subject to any disclaimer, the term of this patent is extended or adjusted under 35 U.S.C. 154(b) by 0 days.

(21) Appl. No.: 17/881,760

(22) Filed: Aug. 5, 2022

(51) Int. Cl.
*H02G 15/068* (2006.01)
*H02G 3/08* (2006.01)

(52) U.S. Cl.
CPC ........... *H02G 15/068* (2013.01); *H02G 3/083* (2013.01)

(58) Field of Classification Search
USPC ........................................................ 174/53
See application file for complete search history.

(56) References Cited

U.S. PATENT DOCUMENTS

| | | | | |
|---|---|---|---|---|
| 5,266,050 A | * | 11/1993 | O'Neil ................. | H02G 3/0625 D13/152 |
| 5,373,106 A | * | 12/1994 | O'Neil ................. | H01R 13/745 174/669 |
| 6,080,933 A | * | 6/2000 | Gretz ..................... | H02G 3/083 174/152 G |
| 7,476,817 B1 | * | 1/2009 | Shemtov .............. | H02G 3/0691 174/661 |
| 8,350,163 B2 | * | 1/2013 | Auray ...................... | F16L 5/00 174/665 |
| 8,791,377 B2 | * | 7/2014 | Jafari ................... | H02G 3/0691 174/665 |
| 2007/0017688 A1 | * | 1/2007 | Pyron ................ | H01R 13/5219 174/59 |

* cited by examiner

*Primary Examiner* — Krystal Robinson
(74) *Attorney, Agent, or Firm* — KDW FIRM PLLC

(57) ABSTRACT

Disclosed is a fitting having a main body including a distal end and a proximal end, and a first split ring coupled to the distal end of the main body, wherein the first split ring includes an opening for receiving a main tab along an outer surface of the main body, and wherein the first split ring includes a set of disengagement tabs on opposite sides of a slot. The fitting may further include a second split ring within an interior of the main body, wherein the second split ring comprises a set of interior arms operable to engage a sheath of a cable.

17 Claims, 15 Drawing Sheets

DETACHABLE SNAP-IN FITTING

BACKGROUND OF THE DISCLOSURE

Field of the Disclosure

The present disclosure relates to electrical fittings and, more particularly, to a detachable snap-in fittings for connecting flexible metal cables to electrical junction boxes.

Discussion of Related Art

As commonly known in the electrical trade, junction boxes are often installed in buildings at points where electrical wires are to be connected to components such as sockets, switches, outlets, and/or other wires. Junction boxes are typically installed by nailing or screwing the junction box to a stud within the wall or ceiling. Wiring cables are brought to the junction box and extended through a wall of the junction box to enter a box interior. The cable is usually sheathed within a corrugated cover, often formed of a helically wound ribbon of metal or plastic, which serves to protect the wires of the cable while still providing flexibility.

Since it is often desirable to firmly secure the cable to the junction box at its point of entry, connectors have been developed which engage the corrugated cover and the junction box together to prevent the cable from being easily pulled from the junction box. However, it is often difficult to disengage the cable and/or connector from the junction box after the connection has been made. It is with respect to this and other drawbacks of the prior art that the present disclosure is provided.

SUMMARY OF THE DISCLOSURE

In one approach, a fitting may include a main body having a distal end and a proximal end, and a first split ring coupled to the distal end of the main body, wherein the first split ring comprises an opening for receiving a main tab along an outer surface of the main body. The first split ring may include a set of disengagement tabs on opposite sides of a slot. The fitting may further include a second split ring within an interior of the main body, wherein the second split ring comprises a set of interior arms operable to engage a sheath of a cable.

In another approach, a detachable fitting may include a main body having a first section and a second section, and a first split ring coupled to first section the main body, wherein the first split ring comprises an opening for receiving a main tab along an outer surface of the first section of the main body, wherein the first split ring comprises a set of disengagement tabs on opposite sides of a slot, and wherein the slot extends to the outer surface of the first section of the main body. The detachable fitting may further include a second split ring coupled to the second section of the main body, wherein the second split ring comprises a set of interior arms operable to engage a sheath of a cable.

In yet another approach, an assembly may include an electrical junction box, and a metal sheath of a cable secured to the electrical junction box by a fitting. The fitting may include a main body having a first section and a second section, and a first split ring coupled to first section the main body, wherein the first split ring comprises an opening for receiving a main tab along an outer surface of the first section of the main body, wherein the first split ring comprises a set of disengagement tabs on opposite sides of a slot, wherein the disengagement tabs extend away from an outer surface of the first split ring wall, and wherein the slot extends to the outer surface of the first section of the main body. The fitting of the assembly may further include a second split ring coupled to the second section of the main body, wherein the second split ring comprises a set of interior arms operable to engage the metal sheath.

BRIEF DESCRIPTION OF THE DRAWINGS

The accompanying drawings illustrate exemplary approaches of the disclosed armored cable assembly so far devised for the practical application of the principles thereof, and in which.

Figure 1:
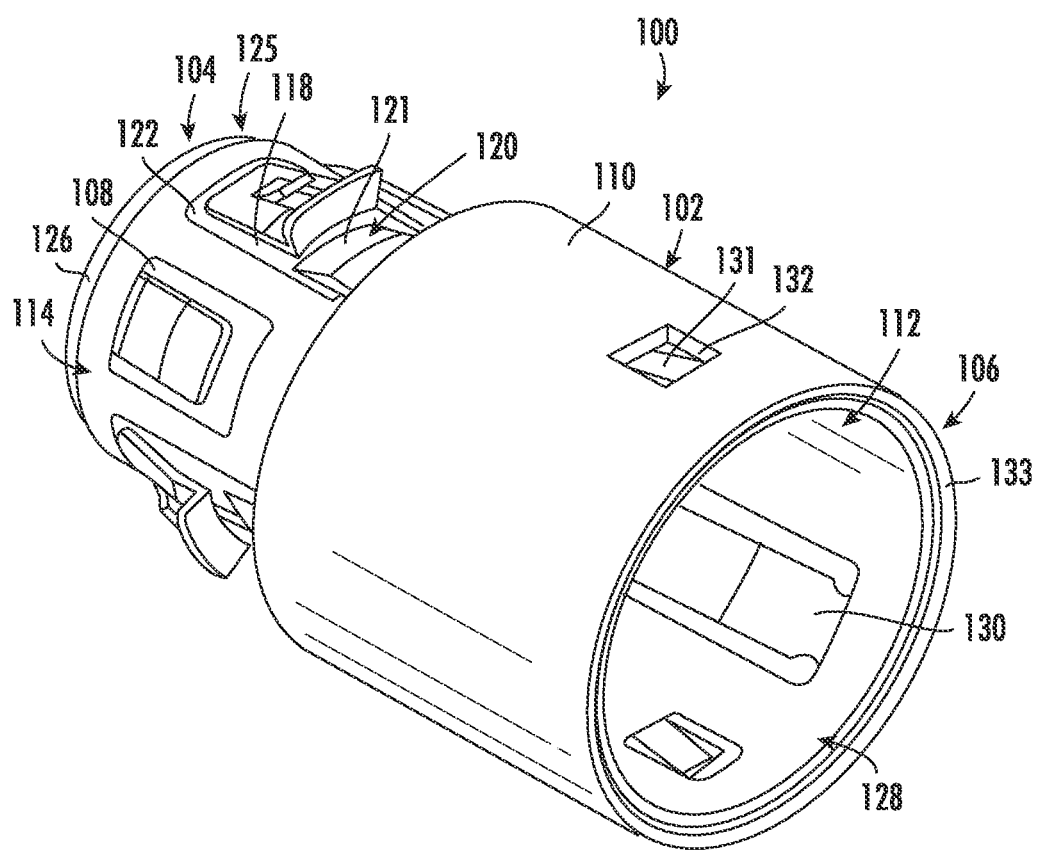
FIG. 1 is a side perspective view of a fitting according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the reusable snap-in fittings may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide a re-usable snap-in fitting capable of quickly connecting and disconnecting a metal conduit from an electrical junction box. In some embodiments, the fitting may include a rear split ring stamping that grips the metal conduit when the metal conduit is inserted into the electrical junction box, and a front split ring stamping with latching features for securing the fitting to the electrical junction box. The front and rear split rings may be coupled to a main body. An optional bushing may be used for wire protection. The fitting is easily removable in that it can be removed from the electrical junction box after installation, and further removed from the metal conduit by hand (e.g., twisted off).

Unlike prior art fitting designs, which use a front split ring that must be removed from inside the electrical junction box, embodiments of the present disclosure allow removal of the fitting from an exterior of the electrical junction box. Furthermore, the front split ring in the present embodiments remains within a wall of the electrical junction box until the technician is ready to remove it.

Figure 2:
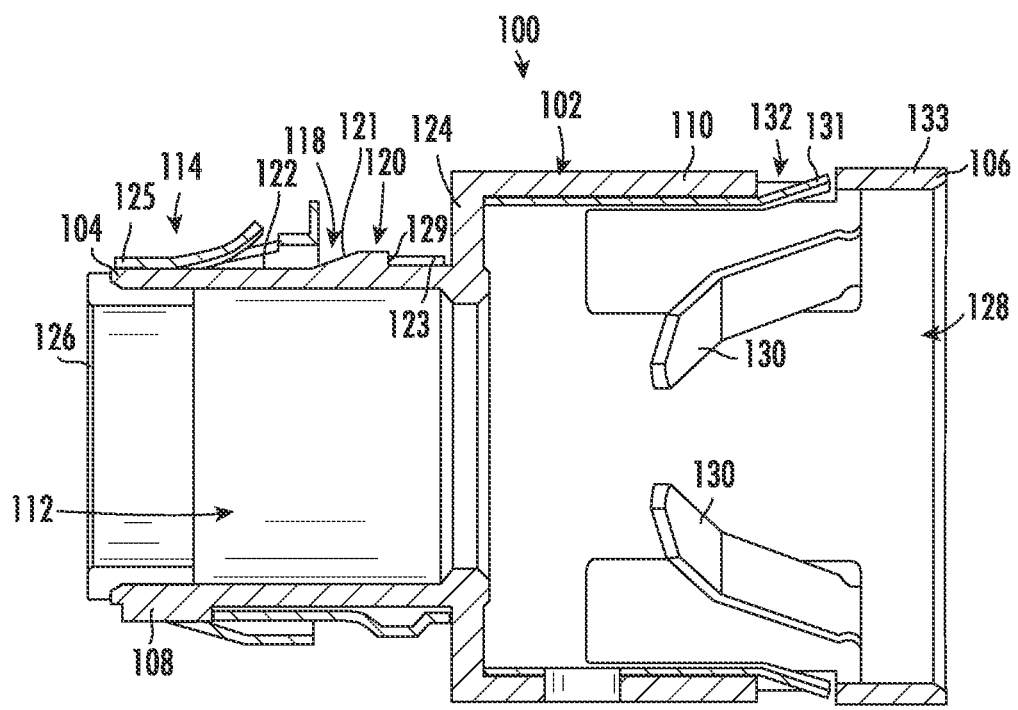
FIG. 2 is a side cross-sectional view of the fitting according to embodiments of the present disclosure.
Figure 3:
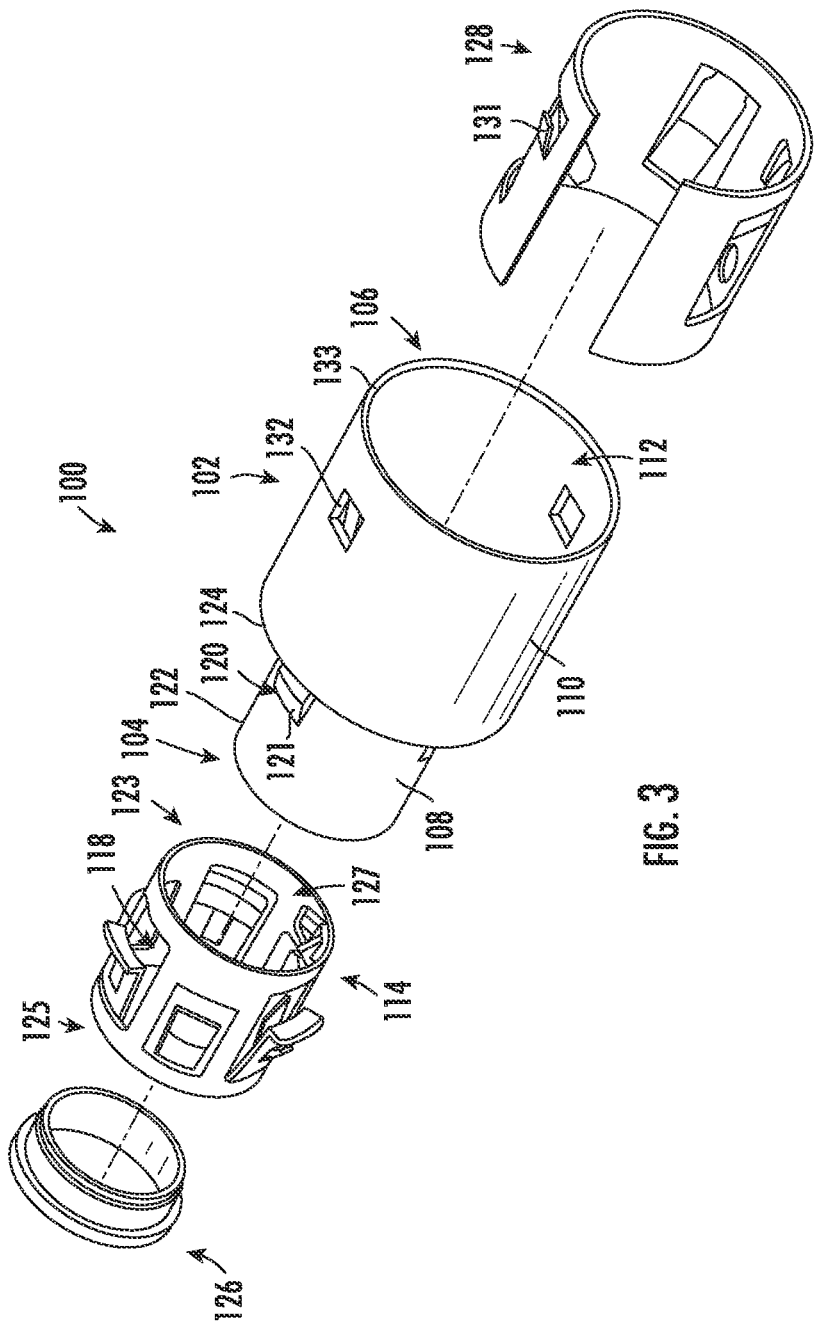
FIG. 3 is an exploded view of the fitting according to embodiments of the present disclosure.

Referring now to FIGS. 1-3, an exemplary fitting 100 according to embodiments of the present disclosure will be described in greater detail. As shown, the fitting 100 may include a main body 102 having a distal end 104 and a proximal end 106. The main body 102 may include a first section 108 connected with a second section 110, wherein an outer diameter of the second section 110 may be larger than an outer diameter of the first section 108. The main body 102 may define an interior 112 operable to receive a cable.

The fitting 100 may further include a first (e.g., front) split ring 114 coupled to the distal end 104 of the main body 102. Although non-limiting, the first split ring 114 may extend over the first section 108 of the main body, with an opening 118 of the first split ring 114 being operable to receive a main tab 120 located along an outer surface 122 of the main body 102. The main tab 120 may include an angled surface 121 to enable the first split ring 114 to slide over the main tab 120 during assembly, and a face 129 (FIG. 2) operable to engage a perimeter defining the opening 118 to retain the main body 102 and the first split ring 114 together. In some embodiments, a proximal end 123 of the first split ring 114 may be positioned adjacent a radial wall 124 of the main body 102. A distal end 125 of the first split ring 114 may optionally receive a bushing 126. As shown, the bushing 126 may extend partially within the interior 112 of the main body 102 to protect cable wiring.

The fitting may further include a second (e.g., rear) split ring 128 coupled to the proximal end 106 of the main body 102. In some embodiments, the second split ring 128 may be positioned within the interior 112 of the second section 110 of the main body 102. As will be described in greater detail herein, the second split ring 128 may include a set of interior arms 130 extending into the interior 112, the interior arms 130 operable to engage a sheath of a cable (not shown). A split ring tab 131 of the second split ring 128 may extend through an opening 132 of a wall 133 of the main body 102 to couple the second split ring 128 and the main body 102 together.

Figure 4A:
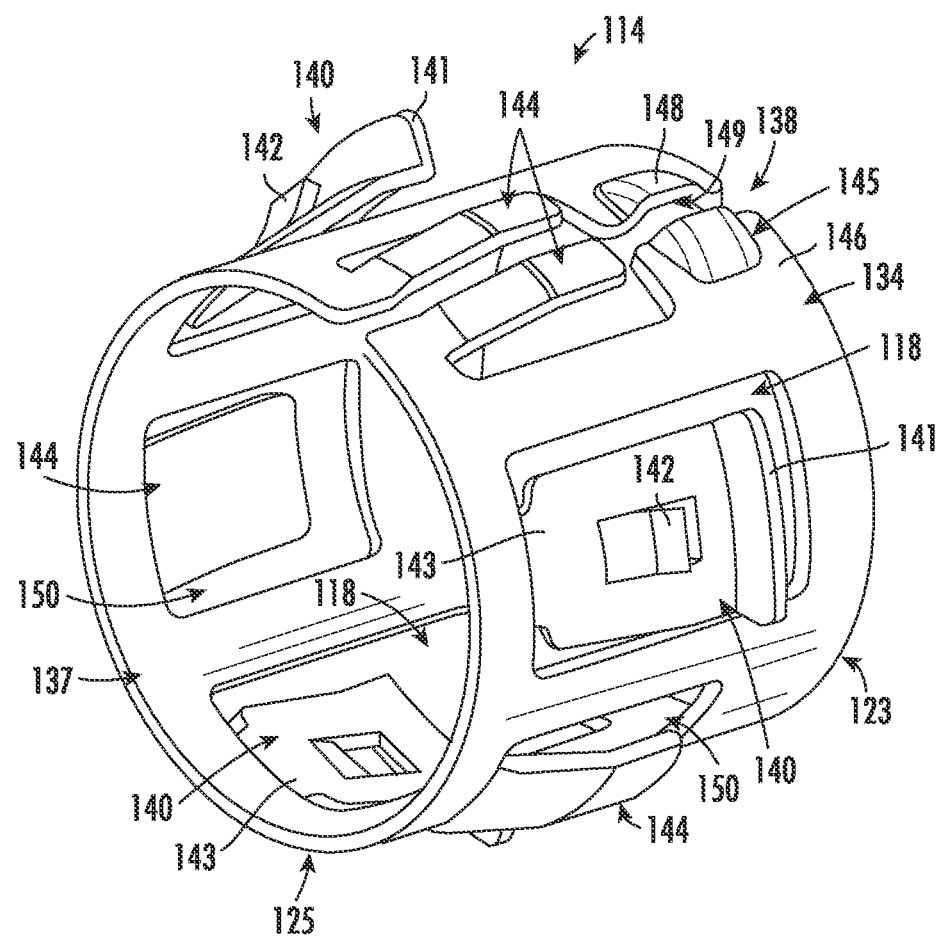
FIG. 4A is a side perspective view of a first split ring of the fitting according to embodiments of the present disclosure.
Figure 4B:
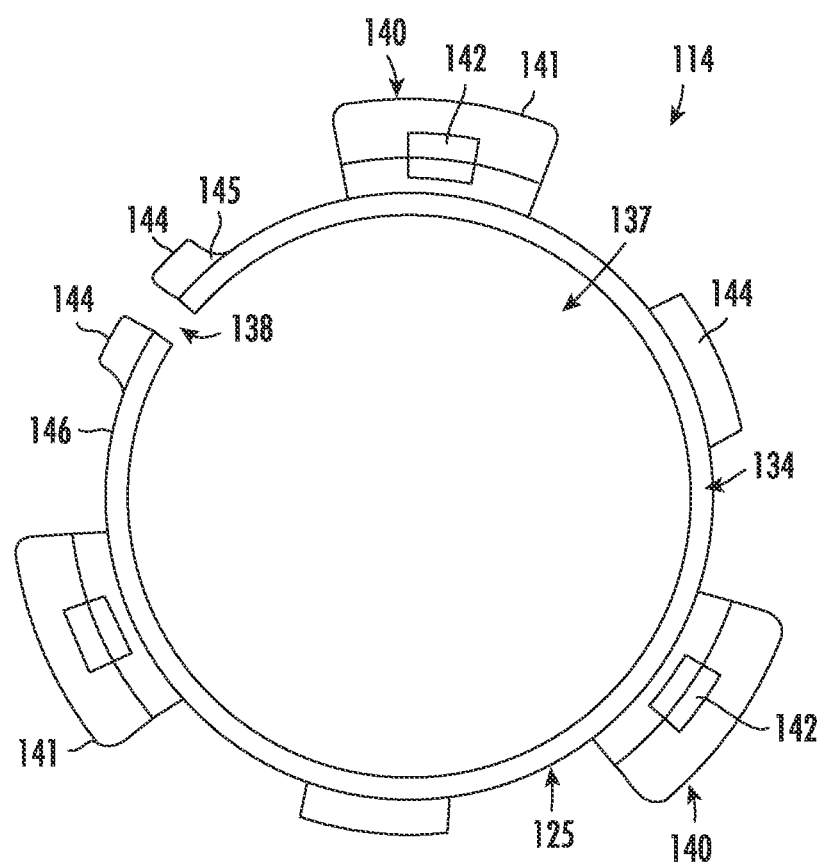
FIG. 4B is an end view of the first split ring of the fitting according to embodiments of the present disclosure.

Turning now to FIGS. 4A-4B, the first split ring 114 according to embodiments of the present disclosure will be described in greater detail. As shown, the first split ring 114 may include a first split ring wall 134 extending between the proximal and distal ends 123, 125. The cylindrically shaped first split ring wall 134 may define an interior 137 and an opening or slot/split 138 extending between the proximal and distal ends 123, 125. The slot 138 allows the first split ring 114 to be compressible. Although non-limiting, the first split ring wall 134 may be a sheet metal body having a constant thickness and diameter from between the proximal and distal ends 123, 125.

The first split ring 114 may include a plurality of latching arms 140 extending from the first split ring wall 134, each of the latching arms 140 extending over corresponding openings 118. As shown, each latching arm 140 includes a flange 141 operable to abut or engage a first side of a wall of an electrical junction box (not shown), and a wall tab 142 operable to abut or engage a second side of the wall of the electrical junction box. In some embodiments, the latching arms 140 are connected to the first split ring wall 134 by a flexible neck region 143. Although three latching arms 140 are shown, it will be appreciated that more or fewer latching arms 140 may be possible in alternative embodiments.

The first split ring 114 may further include a set of bent tabs 144 extending from the first split ring wall 134, the set of bent tabs 144 operable to provide electrical continuity with the electrical junction box. In some embodiments, two of the bent tabs 144 are provided on opposite sides of the slot 138. Each of the bent tabs 144 may connect with the distal end 125 of the first split ring wall 134, and extend over a tab opening 150.

The first split ring 114 may further include a set of disengagement tabs 145 located on opposite sides of the slot 138, the disengagement tabs 145 extending away from an outer surface 146 of the first split ring wall 134. Although not limited to any particular shape, the disengagement tabs 145 may include a curved outer surface 148 and an inner recess 149. As will be described in greater detail herein, the disengagement tabs 145 may be engaged by a tool (e.g., flat screwdriver) to separate the first split ring 114 and the main body 102 from one another. The disengagement tabs 145 may be located proximate the proximal end 125 of the first split ring 114 to permit access thereto during disengagement of the fitting 100 from the electrical junction box.

Figure 5A:
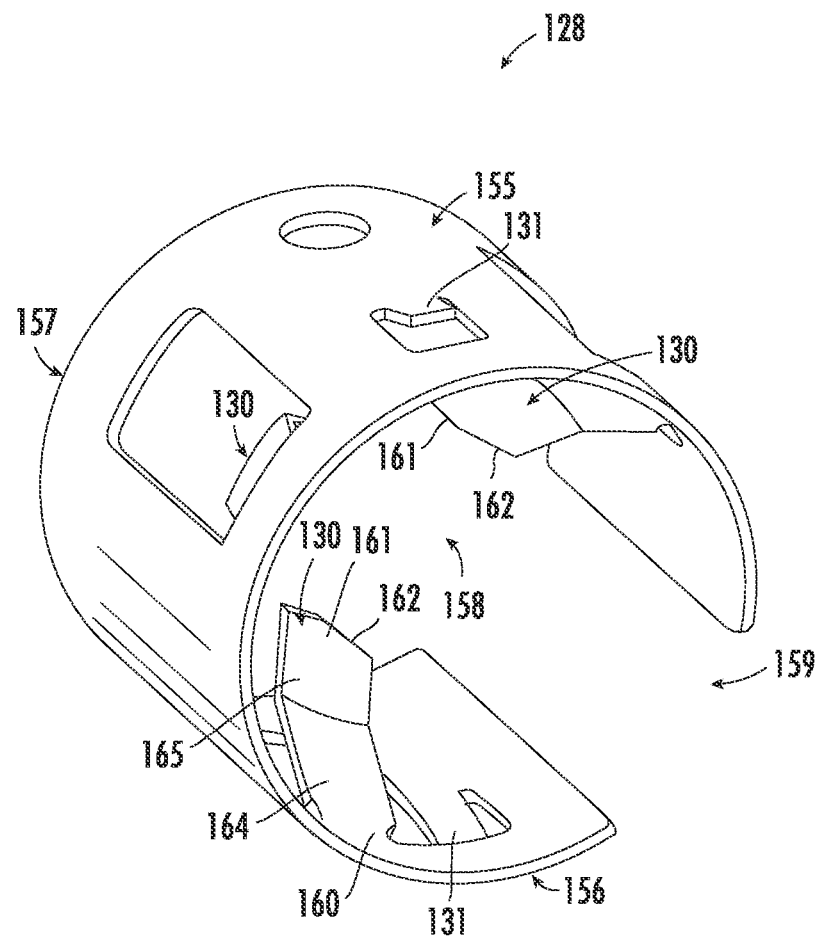
FIG. 5A is a side perspective view of a second split ring of the fitting according to embodiments of the present disclosure.
Figure 5B:
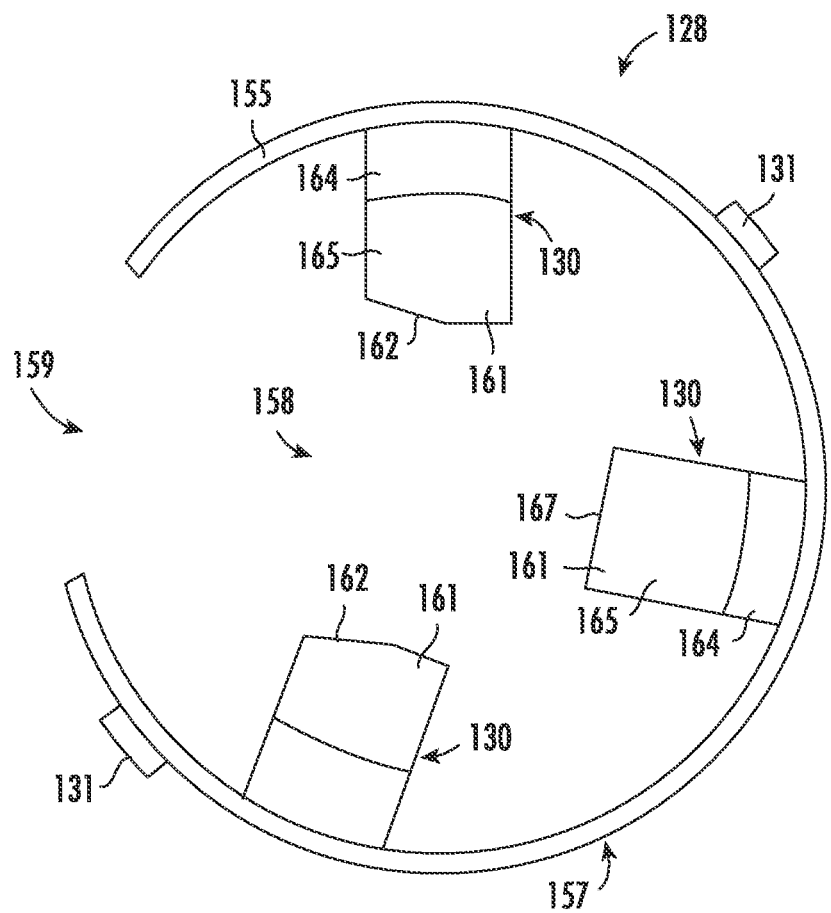
FIG. 5B is an end view of the second split ring of the fitting according to embodiments of the present disclosure.

Turning now to FIGS. 5A-5B, the second split ring 128 will be described in greater detail. As shown, the second split ring 128 may include a second split ring wall 155 extending between a proximal end 156 and a distal end 157. The cylindrically shaped second split ring wall 155 may define an interior 158, and may include a split, slot, or opening 159 extending between the proximal and distal ends 156, 157. The opening 159 permits compression of the second split ring 128. Although not shown, an inner surface of the main body 102 may include a stop or flange to limit compression of the second split ring wall 155. In some embodiments, the second split ring wall 155 may be a zinc die cast body having a constant thickness and diameter between the proximal and distal ends 156, 157. As shown, the second split ring 128 includes one or more split ring tabs 131 configured to extend through the opening 132 of the wall 133 of the main body 102.

As further shown, the interior arms 130 of the second split ring 128 may extend into the interior 158 to engage the sheath of the cable and to provide continuity therebetween. Each of the interior arms 130 may connect to the second split ring wall 155 at a flexible neck region 160. Although non-limiting, the interior arms 130 may have a first section 164 connected to the flexible neck region 160, and a second section 165 angled further into the interior 158. A free end 161 of the second section 165 may have a slanted or angled tip 162 to permit the second split ring 128 to be more easily untwisted from the metal sheath of the cable. As best shown in FIG. 5B, one of the interior arms 130 have a flat tip 167 at the free end 161 thereof.

Figure 6:
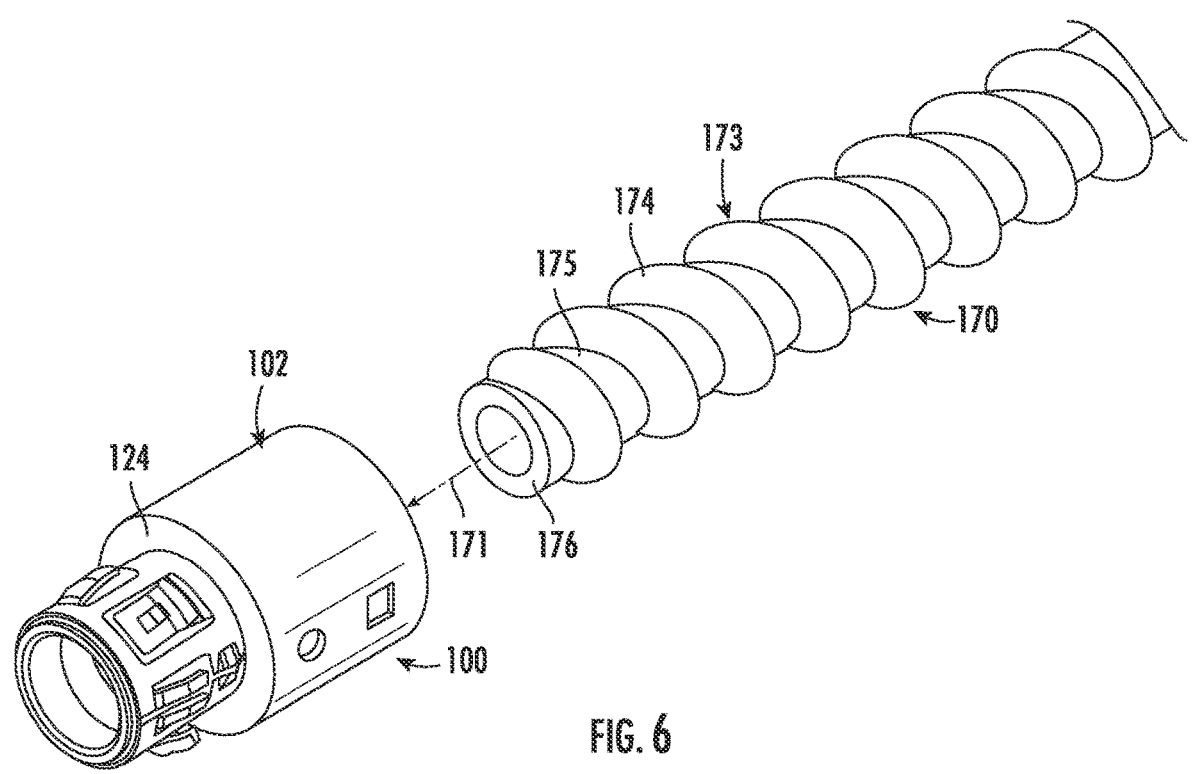
FIGS. 6-7 demonstrate assembly of the fitting with an electrical junction box and a cable according to embodiments of the present disclosure.

Turning now to FIG. 6, assembly of the fitting 100 with a cable 170 according to embodiments of the present disclosure will be described. In the non-limiting embodiment shown, the cable 170 may include a metallic sheath 173 having a series of peaks 174 and valleys 175 extending helically along its length. An end 176 of the cable 170 may be inserted into the fitting 100, as shown by the arrow 171. The interior arms 130 of the second split ring 128 (FIGS. 5A-5B) may slide over the metallic sheath 173 and deflect towards the main body 102. Once the end 176 of the cable 170 reaches the radial wall 124 of the main body 102, the free end 161 of the interior arms 130 may be positioned within one of the valleys 175 of the metallic sheath 173. Due to the angles of the first section 164 and the second section 165 of the interior arms 130, the cable 170 is prevented from being easily pulled out of fitting, e.g., in a direction opposite to the arrow 171.

Figure 7:
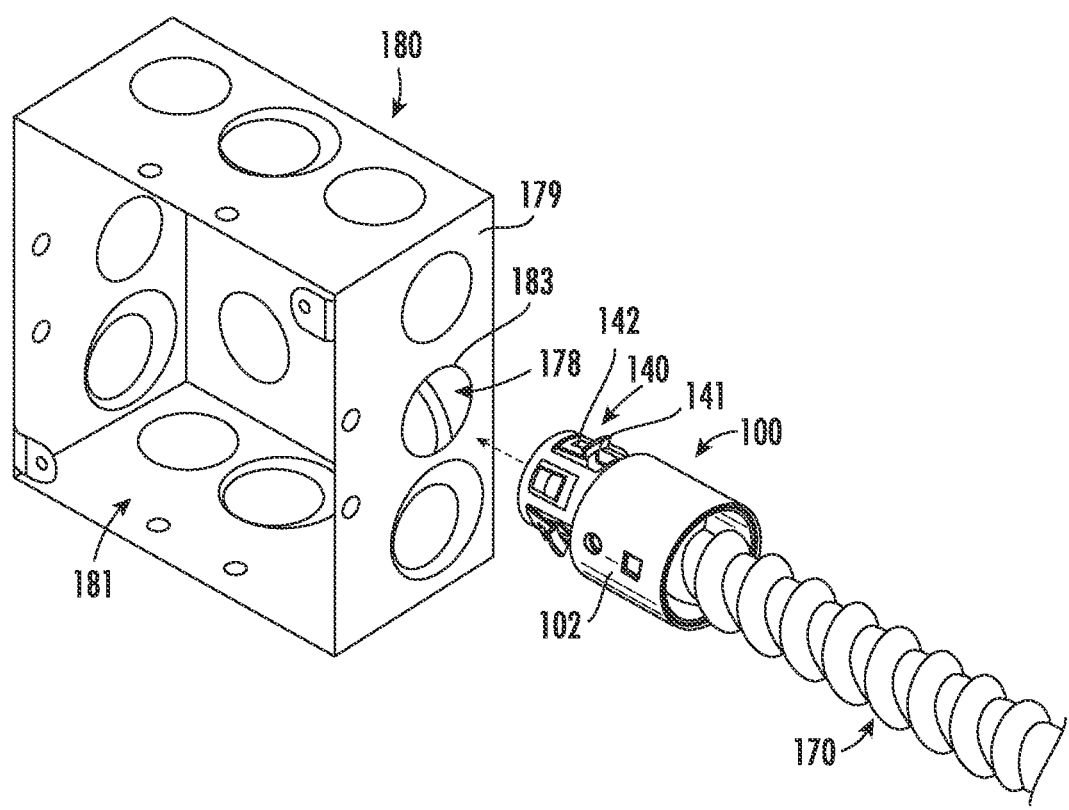

Next, as shown in FIG. 7, the assembled fitting 100 and cable 170 may be inserted through an opening 178 of a wall 179 of an electrical junction box (hereinafter "box") 180. As the fitting 100 is inserted into an interior 181 of the box 180, the latching arms 140 of the first split ring 114 will engage the wall 179. More specifically, the wall tabs 142 are pressed down/inward towards the main body 102 as the tabs 142 engage a perimeter 183 of the opening 178. After the wall tabs 142 pass the wall 179, the wall tabs 142 spring away from the main body 102. The wall tabs 142 may engage or abut an interior surface of the wall 179 to prevent the fitting 100 from being easily removed from the box 180. In this position of the fitting 100, the flange 141 of each latching arm 140 may abut an exterior 184 of the wall 179 to prevent the fitting 100 from moving further into the interior 181. The fitting 100 and cable 170 are now secured to the box 180.

Figure 8:
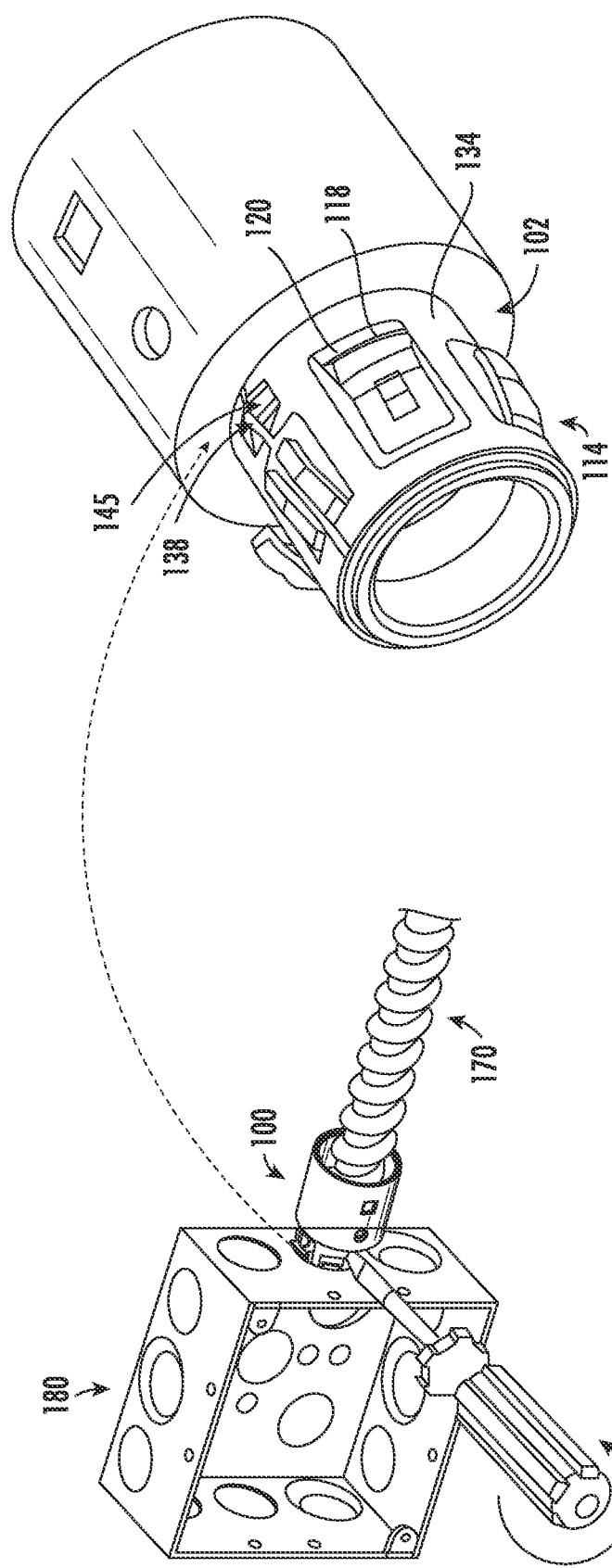
FIGS. 8-11 demonstrate disassembly of the fitting from the electrical junction box and the cable according to embodiments of the present disclosure.
Figure 9:
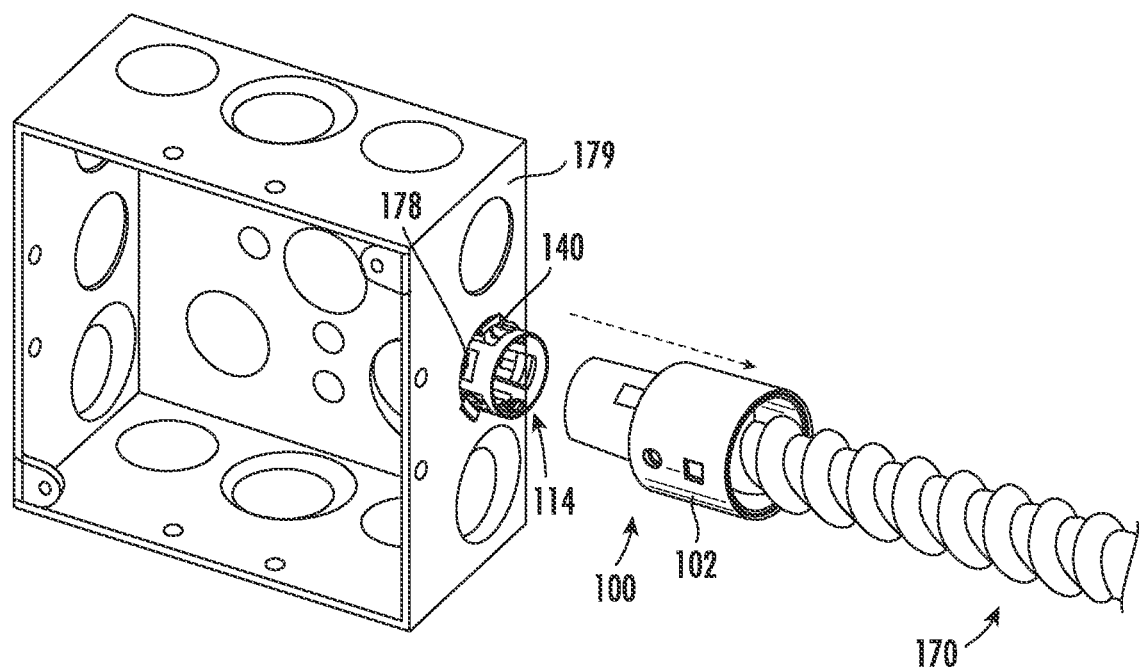

As shown in FIG. 8, to remove the cable 170 from the box 180, a tool such as a screwdriver or blade, may be inserted into the slot 138 between the set of disengagement tabs 145 and twisted. As the tool biases the disengagement tabs 145, the first split ring wall 134 may be separated from the main body 102 until the face 129 (FIG. 2) of the main tab 120 is no longer engaged with the perimeter defining the opening 118 of the first split ring 114. The main body 102 and the cable 170 may then be pulled away from the box 180, as demonstrated in FIG. 9. The first split ring 114 may remain secured to the wall 179 of the box 180 until a technician removes it, e.g., by squeezing the latching arms 140 until the wall tabs 142 are capable of passing through the opening 178.

Figure 10:
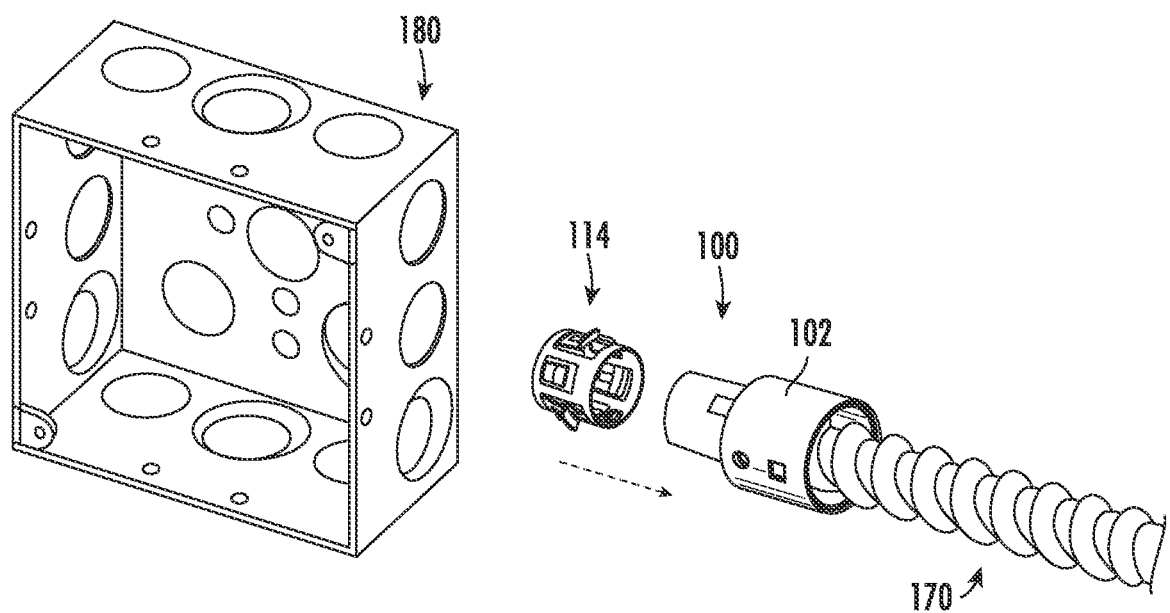
Figure 11:
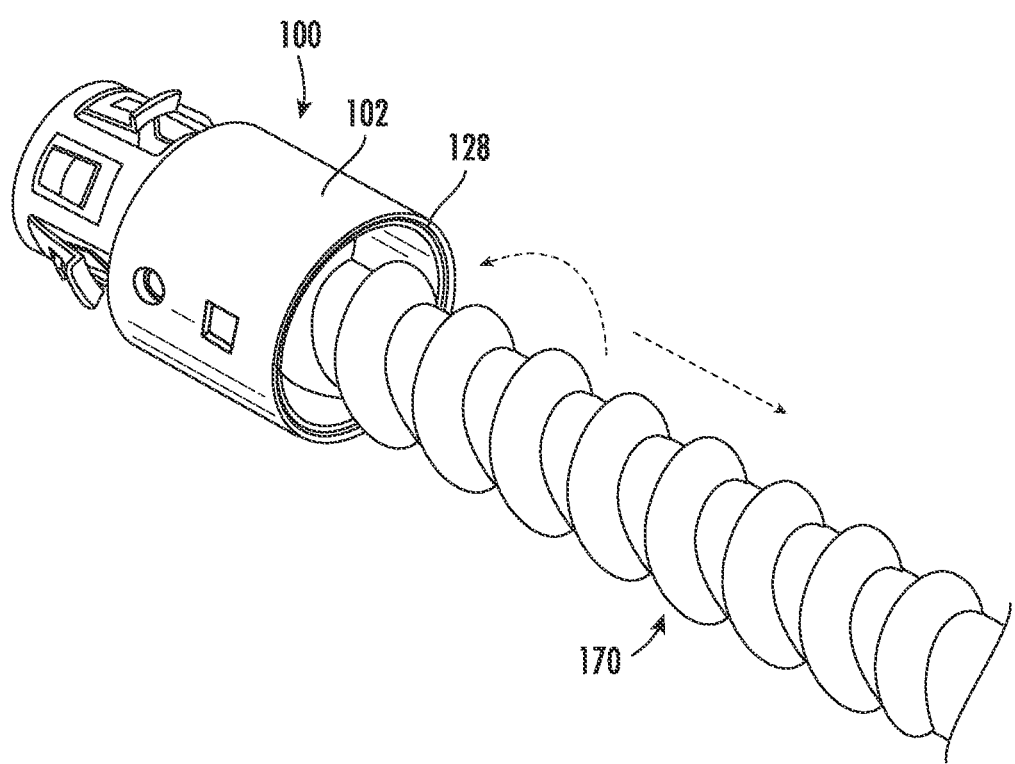

The first split ring 114 may then be reattached to the first section 108 of the main body 102 of the fitting 100, as shown in FIG. 10, and the fitting 100 may be detached from the cable 170, as shown in FIG. 11. Alternatively, the fitting 100 may first be detached from the cable 170, followed by reattachment of the first split ring 114 with the main body 102. As noted above, the fitting 100 may be twisted to disengage the second split ring 128 from the metallic sheath 173. That is, as the fitting 100 rotates, the interior arms 130 of the second split ring 128 are advanced towards the end 176 of the cable 170 until separation is achieved. The fitting 100 and/or the cable 170 advantageously may then be re-used, as desired.

Figure 12:
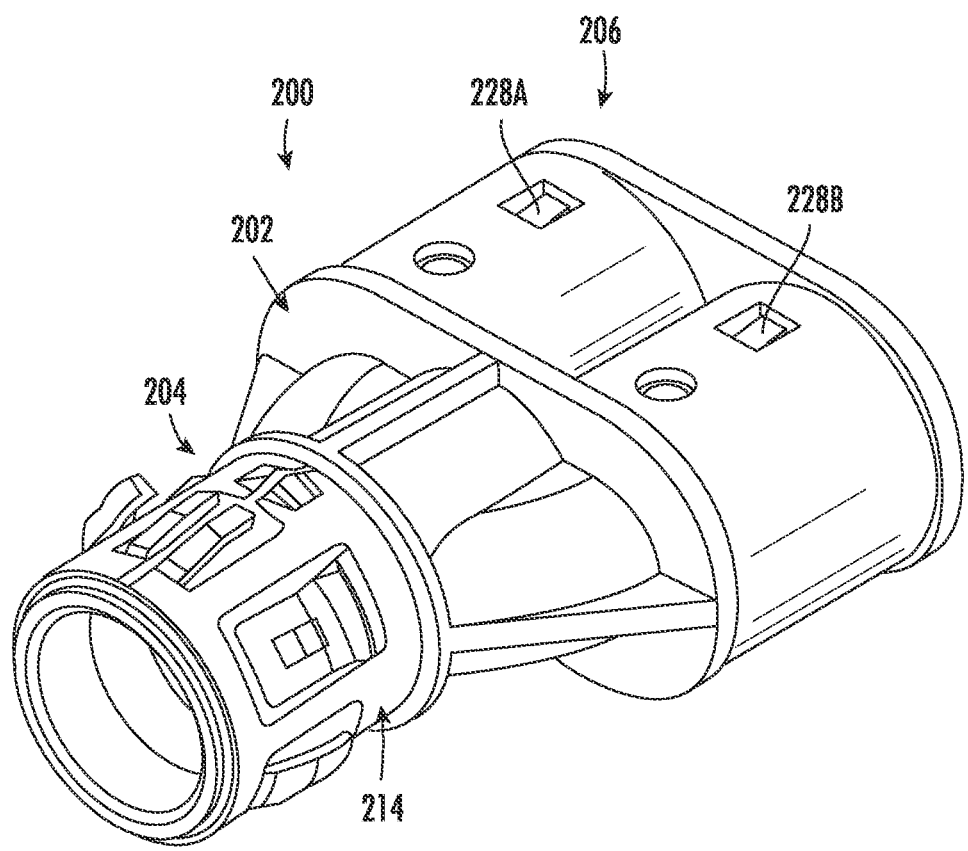
FIG. 12 is a side perspective view of a fitting according to embodiments of the present disclosure.

FIG. 12 demonstrates a fitting 200 according to another embodiment of the present disclosure. The fitting 200 may be the same or similar to the fitting 100 described herein. As such, only certain aspects of the fitting 200 may hereinafter be described for the sake of brevity. The fitting 200 is operable to deliver wiring from two metallic cables through a same opening of a junction box. As shown, the fitting 200 may include a main body 202, a first (e.g., front) split ring 214 coupled to a distal end 204 of the main body 202, and a set of second split rings 228A, 228B coupled to a proximal end 206 of the main body 202. Although non-limiting, the first split ring 214 may extend over a first section of the main body 202, while the second split rings 228A, 228B may be inserted within corresponding chambers of the main body 202. The main body 202 may have a flange or ridge 288 operable to abut the first split ring 214. Similar to the fitting 100 described herein, each of the second split rings 228 may include a set of interior arms operable to engage a sheath of each cable (not shown).

Figure 13:
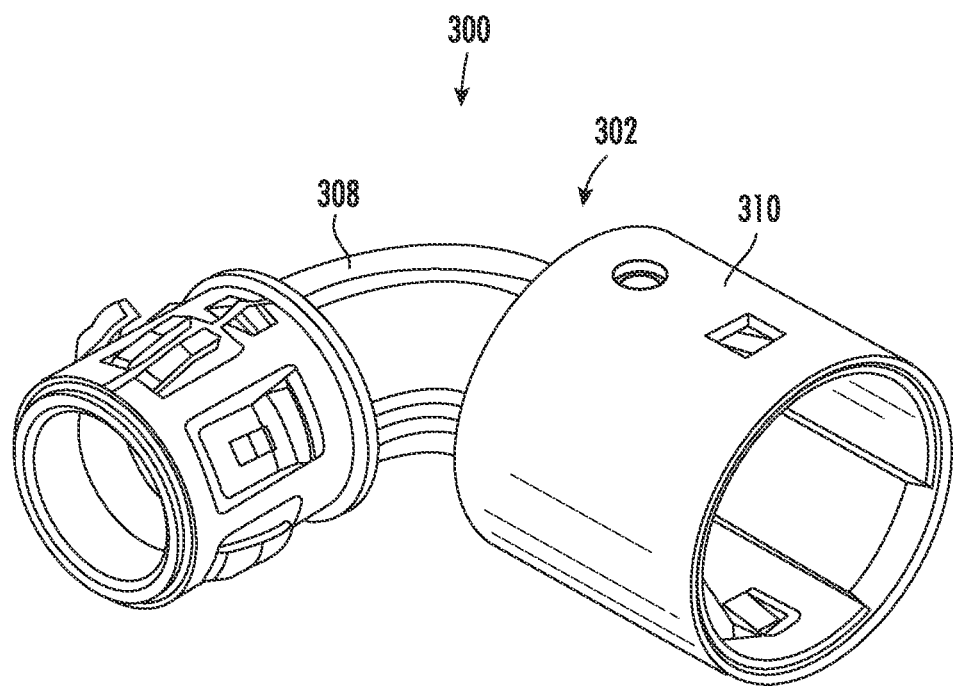
FIG. 13 is a side perspective view of a fitting according to embodiments of the present disclosure.

FIG. 13 demonstrates a fitting 300 according to another embodiment of the present disclosure. The fitting 300 may be the same or similar to the fitting 100 described herein. As such, only certain aspects of the fitting 300 may hereinafter be described for the sake of brevity. As shown, the fitting 300 may include a main body 302 having a first section 308 and a second section 310, wherein an outer diameter of the second section 310 may be larger than an outer diameter of the first section 308. In this embodiment, the first section 308 may be curved or angled to enable the fitting 300 to be used in tighter locations. Although non-limiting, a first split ring 314 may extend over the first section 308 of the main body 302, while a second split ring 328 may be inserted within an interior of the second section 310 of the main body 302.

It will be appreciated that several different types of electrical cable and conduit can be connected to a junction box with the fittings of the present disclosure including, but not limited to, MC/HCF steel or aluminum cable, AC/HCF steel or aluminum cable, flexible metal conduit steel and aluminum, including both regular and reduced wall thickness, and MC cable continuous corrugated aluminum. Although the description above contains many specific descriptions, materials, and dimensions, these should not be construed as limiting the scope of the disclosure, but as merely providing illustrations of some embodiments.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A fitting, comprising:
   a main body including a distal end and a proximal end;
   a first split ring coupled to the distal end of the main body, wherein the first split ring comprises an opening for receiving a main tab along an outer surface of the main body, and wherein the first split ring comprises a set of disengagement tabs on opposite sides of a slot; and
   a second split ring within an interior of the main body, wherein the second split ring comprises a set of interior arms operable to engage a sheath of a cable, and wherein the second split ring further comprises a split ring tab extending through an opening of the main body.

2. The fitting of claim 1, wherein the main body comprises a first section and a second section, wherein the first split ring extends over the first section, and wherein the second section extends over the second split ring.

3. The fitting of claim 1, wherein the first split ring comprises a plurality of latching arms extending outwardly from a first split ring wall, and wherein at least one latching arm of the plurality of latching arms comprises:
   a flange operable to abut a first side of a wall of an electrical junction box; and
   a wall tab operable to abut a second side of the wall of the electrical junction box.

4. The fitting of claim 3, wherein the at least one latching arm extends over the opening of the first split ring.

5. The fitting of claim 3, wherein the first split ring further comprises a set of bent tabs extending from the first split ring wall, the set of bent tabs operable to provide electrical continuity with the electrical junction box.

6. The fitting of claim 3, wherein the set of disengagement tabs extend away from an outer surface of the first split ring wall.

7. The fitting of claim 1, wherein at least one interior arm of the set of interior arms of the second split ring comprises:
   a fixed end connected to a second split ring wall; and
   a free end extending from the fixed end, the free end having an angled tip.

8. A detachable fitting, comprising:
   a main body including a first section and a second section;
   a first split ring coupled to first section the main body, wherein the first split ring comprises an opening for receiving a main tab along an outer surface of the first section of the main body, wherein the first split ring comprises a set of disengagement tabs on opposite sides of a slot, wherein the slot extends to the outer surface of the first section of the main body, and wherein the first split ring comprises a plurality of latching arms extending outwardly from a first split ring wall, and wherein at least one latching arm of the plurality of latching arms comprises:
      a flange operable to abut a first side of a wall of an electrical junction box; and
      a wall tab operable to abut a second side of the wall of the electrical junction box; and
   a second split ring coupled to the second section of the main body, wherein the second split ring comprises a set of interior arms operable to engage a sheath of a cable.

9. The detachable fitting of claim 8, wherein the first split ring extends over the first section, and wherein the second section extends over the second split ring.

10. The detachable fitting of claim 8, wherein the at least one latching arm extends over the opening of the first split ring.

11. The detachable fitting of claim 8, wherein the first split ring further comprises a set of bent tabs extending from the first split ring wall, the set of bent tabs operable to provide electrical continuity with the electrical junction box.

12. The detachable fitting of claim 8, wherein the disengagement tabs extend away from an outer surface of the first split ring wall.

13. The detachable fitting of claim 8, wherein at least one interior arm of the set of interior arms of the second split ring comprises:
   a fixed end connected to a second split ring wall; and
   a free end extending from the fixed end, the free end having an angled tip.

14. An assembly, comprising:
an electrical junction box;
a metal sheath of a cable secured to the electrical junction box by a fitting, the fitting comprising:
   a main body including a first section and a second section;
   a first split ring coupled to first section the main body, wherein the first split ring comprises an opening for receiving a main tab along an outer surface of the first section of the main body, wherein the first split ring comprises a set of disengagement tabs on opposite sides of a slot, wherein the set of disengagement tabs extend away from an outer surface of the first split ring wall, and wherein the slot extends to the outer surface of the first section of the main body, and wherein the first split ring comprises a plurality of latching arms extending outwardly from a first split ring wall, and wherein at least one latching arm of the plurality of latching arms comprises:
   a flange operable to abut a first side of a wall of an electrical junction box, and wherein the latching arm extends over the opening of the first split ring; and
   a wall tab operable to abut a second side of the wall of the electrical junction box; and
   a second split ring coupled to the second section of the main body, wherein the second split ring comprises a set of interior arms operable to engage the metal sheath.

15. The assembly of claim 14, wherein the first split ring extends over the first section, and wherein the second section extends over the second split ring.

16. The assembly of claim 14, wherein the first split ring further comprises a set of bent tabs extending from the first split ring wall, the set of bent tabs operable to provide electrical continuity with the electrical junction box.

17. The assembly of claim 14, wherein at least one interior arm of the set of interior arms of the second split ring comprises:
   a fixed end connected to a second split ring wall; and
   a free end extending from the fixed end, the free end having an angled tip.

* * * * *